Patented Apr. 7, 1925.

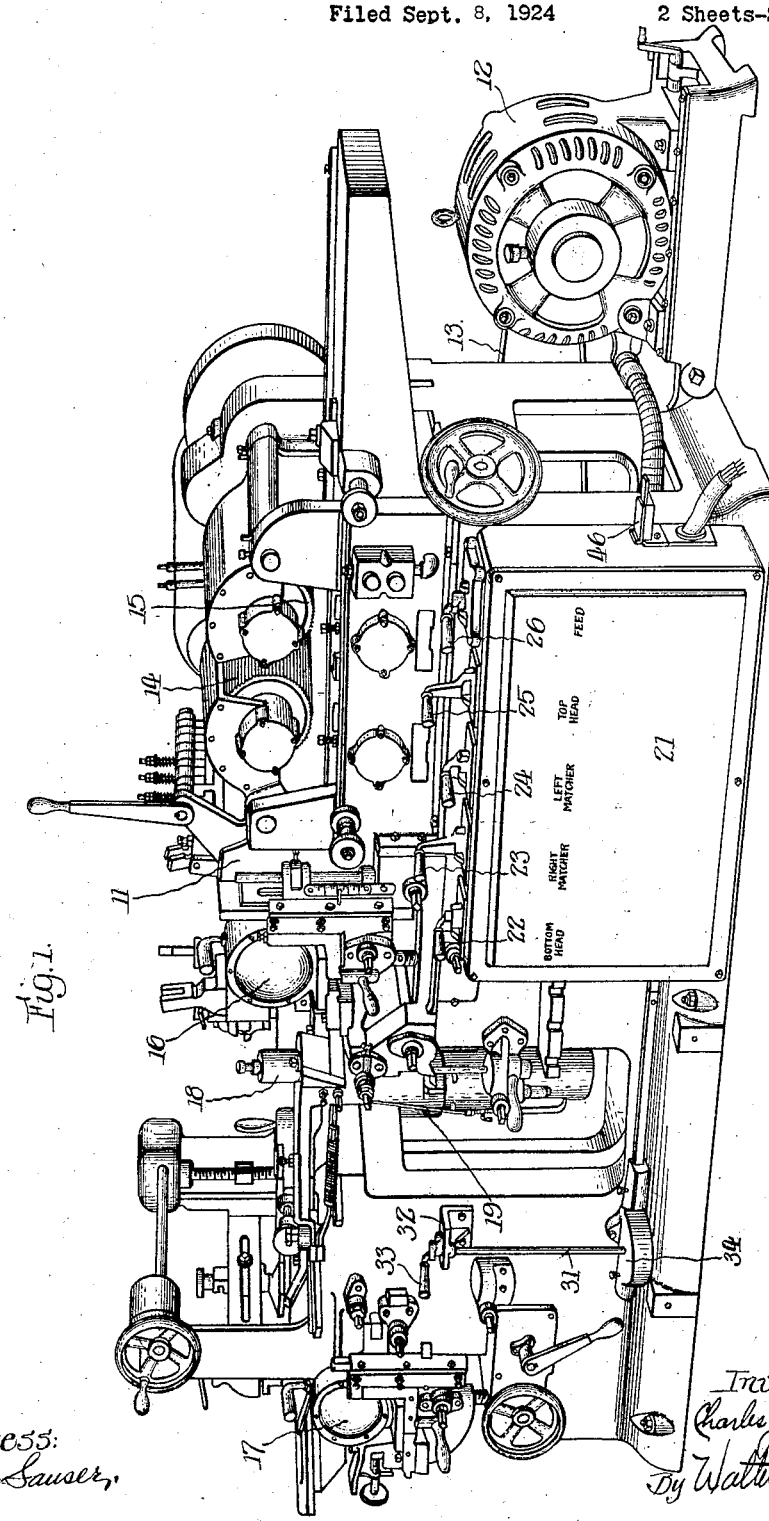

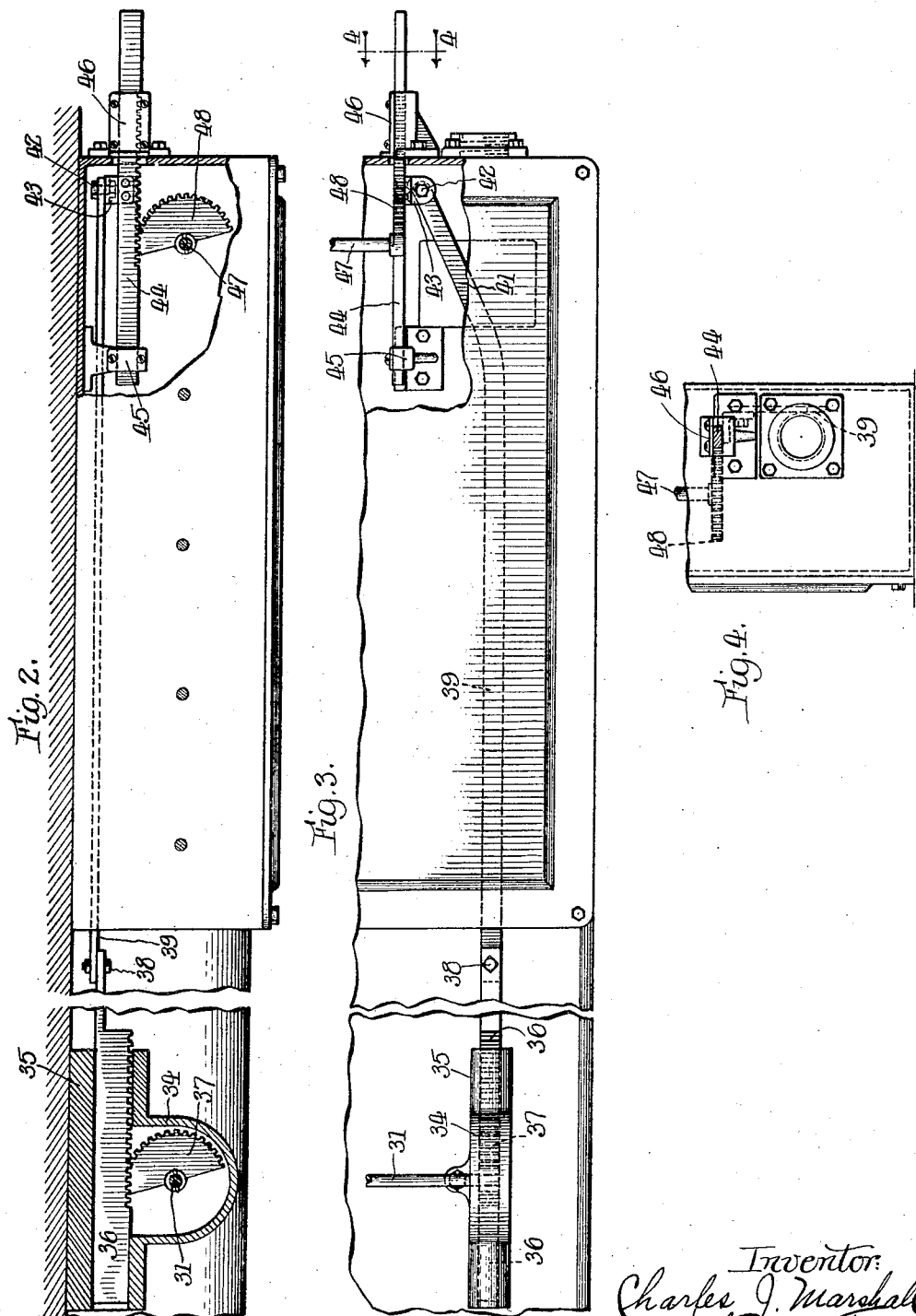

1,532,423

UNITED STATES PATENT OFFICE.

CHARLES J. MARSHALL, OF BELOIT, WISCONSIN, ASSIGNOR TO P. B. YATES MACHINE COMPANY, OF BELOIT, WISCONSIN, A CORPORATION OF WISCONSIN.

ELECTRIC-MOTOR CONTROLLER FOR WOODWORKING MACHINES.

Application filed September 8, 1924. Serial No. 736,432.

*To all whom it may concern:*

Be it known that I, CHARLES J. MARSHALL, a citizen of the United States, and resident of Beloit, in the county of Rock and the State of Wisconsin, United States of America, have invented certain new and useful Improvements in Electric-Motor Controllers for Woodworking Machines, of which the following is a specification.

My invention pertains to structural and functional novel features in electric-controlled mechanisms of woodworking and other similar machines, such, for example, as planers, matchers and moulders.

In machines of this general type and style each of the top and bottom planing cylinders and the two companion or complementary side-heads carrying cutting-knives has it own individual electric-motor to drive or rotate it at suitable speed and in addition the feed-rollers which advance the work through the machine are operated from another electric-motor.

It is desirable or necessary that each of such five motors should be supplied with an electric-controller of well known style, each comprising a suitable shaft carrying electric-contacts designed to coact with appropriate stationary electric-contacts to effect the necessary circuit connections to vary the speed of action of the motor.

In order that the planing machine as a whole may be readily controlled by the operator, such plurality of controllers are conveniently grouped together in a single casing or housing and their operating handles for convenience are more or less near to one another for ease in governing the actuation of the several parts of the complete mechanism.

Experience has demonstrated, however, that the operation of the electric-motor driven feed-rollers should be capable of control or regulation from more than one point, and accordingly, in consonance with the principles of this invention, a second control-handle is provided near the delivery end of the machine which is mechanically and operatively connected to the feed-controller in the housing near the in-feed end of the machine so that such controller may be actuated from either one of two spaced positions by means of its main handle on its shafts and by means of the remote handle referred to.

In order to enable those skilled in this art to have a full and complete understanding of the invention, both from structural and operating standpoints, in the accompanying drawings, forming a part of this specification, and throughout the several views of which like reference characters refer to the same parts, I have illustrated a preferred and desirable embodiment of the invention as applied to moulders.

In these drawings:—

Figure 1 is a perspective view of the moulder equipped with the present invention;

Figure 2 is a horizontal fragmentary section along the top of the controller casing with parts broken away to more clearly illustrate the construction;

Figure 3 is a fragmentary elevation of the lower portion of the controller structure with parts omitted for clearness of presentation; and Figure 4 is a fragmentary vertical cross-section on the line 4—4 of Figure 3.

Referring to these drawings, it will be perceived that the moulder, characterized as a whole, 11, illustrated therein, is of the modern type employing the five electric-drive motors specified, but only one of them, 12, is fully shown, it being deemed unnecessary to depict the others, since they are well known in the art.

This motor 12 by means of a belt 13 and a pulley on the far side of the moulder drives the stock feed mechanism of the machine including among other parts the usual top feed rollers 14 and 15.

The positions of the upper and lower cylinders are indicated by the reference numerals 16 and 17, although the cylinders themselves and their operating motors are not shown, the latter being on the other side of the moulder.

One only, 18, of the two side-heads is depicted, the companion one being concealed in Figure 1 by the other parts of the appliance, the electric drive motor for side-head 18 being contained in casing 19.

The five upright controllers (not illustrated) are encased in a suitable housing 21 near the in-feed end of the moulder and the upper protruding ends of their shafts are fitted with the laterally extended control-handles 22, 23, 24, 25 and 26.

Handles 22 and 25 of the electric-controllers for the motors actuating the bottom and top heads, respectively, are at different elevations as shown, and handles 23 and 24 for the controllers of the right matcher and left matcher heads, respectively, are also on different levels, the two lower ones of the two sets being at about the same height, and the two elevated ones being at about the same level.

The right-hand controller-handle 26, by means of which the controller for the feed-motor 12 is operated, is at a height intermediate those of the other groups of handles specified, whereby it may be readily distinguished from the others merely by its position.

To permit the feed-motor to be regulated from a position near the delivery or out-feed end of the machine, I provide at that location on the same side of the planer an upright shaft 31 journaled in a bracket 32 mounted on the machine frame, the upper end of such shaft being equipped with an operating handle 33 like or similar to the other handles.

The lower end of shaft 31 projects into a housing 34 having a bearing 35 for a horizontal reciprocatory rack 36, disposed lengthwise the machine, with the teeth of which meshes those of a segment 37 secured to the shaft inside of the housing, one end of such rack at the point 38 being connected to a bar 39 extending into the casing 21 through an appropriate aperture and having its other end in such casing bent upwardly at 41 and connected at 42 to a depending ear or lug 43 secured to a second, horizontal, higher rack 44 slidable in a bearing 45 in the casing and in a bearing 46 on the outer side of one end of the casing, the wall of the latter being apertured in register with such bearing for the accommodation of the rack, a portion only of the length of which is supplied with teeth as shown in Figure 2.

The feed-controller shaft 47, equipped with the operating handle 26 at its upper end, has a segment 48 whose teeth are in co-operative relation with those of the adjacent associated rack 44.

It will be apparent, therefore, that the controller shaft 47, the controller on which (not shown) regulates and governs the action of the feed-motor 12, may be readily operated from two different positions by turning the one or the other handle, 26 or 33, and that the manipulation of either handle correspondingly works the other by reason of the connecting mechanism shown and described and including two sliding racks and their companion gears or pinions.

In case it is desired to regulate the speed of the feed motor or shut it off entirely, this can be accomplished quickly by the operator because the one or the other handle is readily accessible and in convenient position regardless of whether he is at the in-feed or out-feed end of the planer.

In governing the action of the various rotary elements of the moulder, it is desirable that all of them should be controllable by the workman practically from one point, that is, his location in front of the housing 21, but the feed of the machine requires more than this in that it should be capable of regulation when the workman is standing near the handle 33 where he can readily inspect the quality of work performed by the several planing members at the delivery or discharge end of the machine.

Accordingly, the double or duplex operating mechanism is provided for the feed motor controller.

Those skilled in this art will readily understand that many minor mechanical changes may be incorporated in the structure illustrated and described without departure from the substance of the invention as defined by the appended claims, and without the sacrifice of any of its substantial benefits and advantages.

I claim:

1. In a planing-machine having an electric-drive motor for each of four rotary planing elements and an electric-drive motor for the feed-mechanism of the planing-machine, the combination of a housing for five electric circuit controllers, each having a shaft, one controller being provided for each of the specified motors, a handle for each controller shaft, two of such handles being at one level, two others at another, and the feed-motor controller-handle at an intermediate level, a sixth handle near the delivery end of the planing-machine and at substantially the same level as said feed-motor controller-handle, and a mechanical connection between said sixth handle and the feed-motor controller-shaft, whereby the latter may be operated by either of two handles.

2. In a planing-machine having an electric-drive motor for each of the plurality of rotary planing elements and an electric-drive motor for the feed-mechanism of the planing-machine, the combination of a housing for a plurality of electric-circuit controllers, each having a shaft, one controller being provided for each of the specified motors, a handle for each of the controller shafts for the planing element motors, a handle for the shaft of the feed-motor controller, an auxiliary handle remote from said housing, and a mechanical connection between said auxiliary handle and said feed-motor controller-shaft, whereby the latter may be operated by either of two handles.

3. The combination of a woodworking machine having stock-feeding mechanism, an electric-motor drive for said stock-feeding mechanism, an electric-controller for said motor having a shaft, an operating handle on said shaft, a second handle at a distance from said first handle, and rack and pinion connection means between said second handle and said shaft whereby, such controller may be turned by manipulation of either handle.

4. The combination of a woodworking machine having stock-feeding mechanism, an electric-motor drive for said stock-feeding mechanism, an electric-controller for said motor having a shaft, a housing for said controller, a handle on said shaft outside of said housing, a second shaft remote from said first shaft and outside of said housing, a toothed segment on said second shaft, a sliding rack in mesh with said segment, a segment on said controller-shaft inside of said housing, a rack with which said controller-shaft segment meshes, a bearing for said latter rack inside of said housing, a second bearing for the same rack outside of said housing, and an upwardly-bent bar connecting said racks, whereby the controller shaft may be turned by manipulation of either handle.

In witness whereof I have hereunto set my hand and seal.

CHAS. J. MARSHALL. [L. S.]